No. 766,679. PATENTED AUG. 2, 1904.
A. J. FARMER.
DIAL.
APPLICATION FILED OCT. 19, 1903.
NO MODEL.

Witnesses:
H. S. Gaither.
C. C. Cunningham

Inventor:
Arthur J. Farmer.
by Chamberlin & Wilkinson
his Attorneys

No. 766,679. Patented August 2, 1904.

UNITED STATES PATENT OFFICE.

ARTHUR J. FARMER, OF DETROIT, MICHIGAN.

DIAL.

SPECIFICATION forming part of Letters Patent No. 766,679, dated August 2, 1904.

Application filed October 19, 1903. Serial No. 177,545. (No model.)

*To all whom it may concern:*

Be it known that I, ARTHUR J. FARMER, a citizen of the United States, residing at Detroit, county of Wayne, State of Michigan, have invented certain new and useful Improvements in Dials; and I declare the following to be a full, clear, and exact description of the invention, such as will enable others skilled in the art to which it pertains to make and use the same, reference being had to the accompanying drawings, which form a part of this specification.

My invention relates in general to dials, and more particularly to registering-dials especially designed for use in connection with integrating meters for indicating the consumption of gas, water, electricity, &c.

It is well known that much care and considerable skill is required to read the counters of integrating meter-dials such as are commonly used, as the correct reading frequently differs from that apparently indicated by the counter. In dials for meters as at present constructed the number directly indicated by the pointer of any counter cannot be relied upon; but the reading of each counter can frequently only be ascertained by first determining the number which has been passed by the pointer of the next lower counter. It is consequently apparent that such dials cannot be rapidly read with accuracy, especially as the pointers of adjacent counters in most dials move in opposite directions, which renders it difficult to decide at a glance which numbers have been passed by the pointer of each counter.

The primary object of my invention is to provide a dial for integrating meters which may be rapidly and accurately read without necessitating the calculation of the reading of each counter by determining the numbers which the pointer of the next lower counter has passed.

A further object of my invention is to provide a dial for integrating meters which will be simple in arrangement, inexpensive in manufacture, and efficient in use.

My invention will be more fully described hereinafter with reference to the accompanying drawings, in which the same is illustrated as embodied in two convenient and practical forms, and in which—

Figure 1:
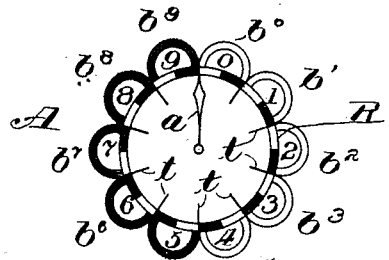
Figure 2:
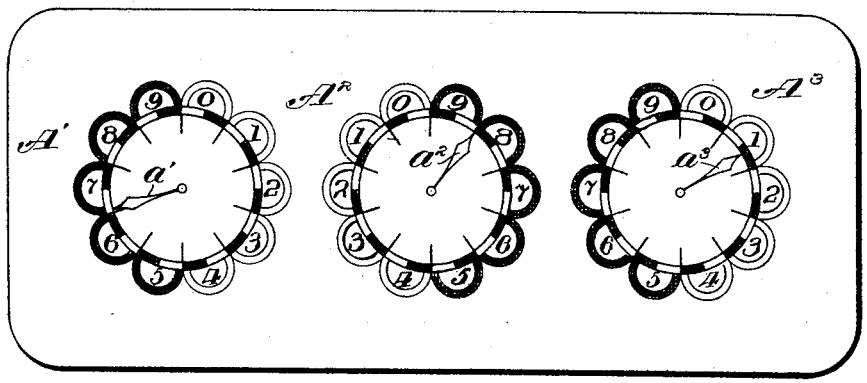
Figure 3:
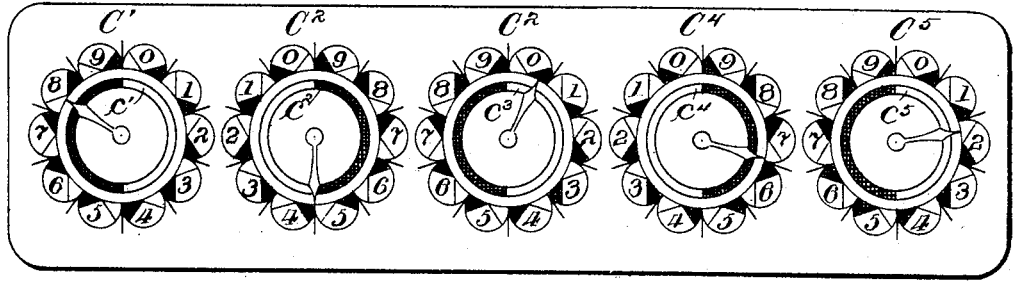

Figure 1 indicates one form of counter for my improved dial. Fig. 2 shows my improved dial as comprising three counters, and Fig. 3 shows the embodiment of my improved dial comprising five counters.

Similar reference characters are used in the several figures of the drawings to indicate similar parts.

Referring to Fig. 1, A indicates a counter the circular circumference of which is divided into a predetermined number of arcs, each of which is surrounded by an arch formed by concentric curved lines having a less radius than the radius of the circumference of the counter. Reference characters $b^0$, $b'$, $b^2$, $b^3$, $b^4$, $b^5$, $b^6$, $b^7$, $b^8$, and $b^9$ designate the arches last referred to, which are described around the arcs of the circumference of the counter to project or make the same more prominent. $a$ designates a pointer which is moved over the face of the counter and indicates the reading thereof. Within the arches above referred to are located numerals progressively arranged from "0" to "9." These numerals designate the arcs into which the circumference of the counter is divided, and when the pointer $a$ is over any particular arc the reading of the counter is the number of such arc. The counter has the usual registering-points $t$ $t$, &c.; but around its circumference are described concentric circles forming the ring R, which is divided into sections, hereinafter referred to as ring-sections. These ring-sections are alternately white and black, and it will be observed that within each arch $b^0$ $b'$ $b^2$, &c., there is one white ring-section and one black ring-section. Corresponding ring-sections in said arches $b^0$ $b'$ $b^2$, &c., agree in their surface coloring or are capable of producing similar optical effects. The choice of white and black surfaces shown in the drawings is only arbitrary and merely for the purpose of illustration. The arches surrounding the numbers from "0" to "4" are white in the drawings and in practice are capable of producing an optical effect similar to the effect produced by the surface of the ring-sections in the arcs which are first reached by the pointer in its regular travel. The arches around the numbers from "5" to "9" are shown as black in the drawings and in practice are of such color or character as to produce the same optical effect as is produced by the surface of the ring-sections within the several arcs last reached by the pointer in its regular rotation.

In Fig. 2 I have shown a dial consisting in three counters. As is often the case in dials comprising a plurality of counters, the pointers of the outside counters A' and $A^3$ move in the direction of the hands of a clock, while the pointer $a^2$ of the middle counter $A^2$ moves in a direction opposite to the movement of the hands of a clock.

In dials as ordinarily constructed at the present time the numbers are located adjacent to the points where the small arches $b^6$, &c., meet, the figure "0" being directly at the top of the counter and the figure "6" directly at the bottom, and the reading of each counter is determined by the numeral which has been passed by the pointer. If, however, the pointer is directly above or a slight distance either side of a number, the counter can only be read by first ascertaining from the next lower counter (which is ordinarily the one to the right) whether the pointer thereon is opposite one of the spaces from "1" to "5" or whether it is opposite one of the spaces from "6" to "0." If the former is true, the reading of the counter is the higher number, while in the latter case the lower number should be read. Now, referring to Fig. 2, it will be noticed that the pointer of counter A' is at the point where the two arcs "6" and "7" unite. Hence it is not clear without further investigation whether the counter should be read "6" or "7." As the pointer of counter A' travels over only one arc, while the pointer of counter $A^2$ travels the entire circumference or the ten arcs, it is evident that if the pointer of $A^2$ is nearing the end of a revolution—i. e., registers "5," "6," "7," "8," or "9"—"6" is the reading of counter A'; but, on the other hand, if the pointer on counter $A^2$ is just commencing a revolution—i. e., registers "0," "1," "2," "3," or "4"—the reading of the counter A' should be "7." If the pointer of the counter to the right happens to be in an uncertain position, the second lower counter—i. e., $A^3$—must then be inspected in order to determine the reading of counters $A^2$ and A'.

In my improved dial the positions of the pointers of adjacent counters may be readily determined in the following manner: When the pointer of a counter—as, for instance, A'—is in a doubtful position, it is merely necessary to glance at the next lower counter $A^2$ to ascertain whether its pointer is opposite a space designated by a numeral the surface of the arch around which is black or white, which at once locates the pointer of the counter A' within the arc the ring-section in which adjacent to the pointer corresponds in color to the surface of the arch around the number toward which the pointer in the counter $A^2$ points. For instance, the pointer of counter A' should read "6," inasmuch as the pointer of the counter $A^2$ is opposite a numeral the surface of the arch around which is black. In a similar manner the pointer of the counter $A^2$ should be read "9," inasmuch as the pointer of the next lower counter $A^3$ is opposite a numeral the surface of the arch around which is white. If, however, the pointer of the counter $A^3$ had been opposite a space designated by one of the numerals from "5" to "9," the pointer of the counter $A^2$ should have been read "8," inasmuch as the surface of the ring-section adjacent to the pointer within the arc "8" is black, as are also the surfaces of the arches around the numerals "5" to "9" on the counter $A^3$. In the manner above described the dial illustrated in Fig. 2 is easily and accurately read as registering "691."

In Fig. 3 I have shown a dial comprising five (5) counters C', $C^2$, $C^3$, $C^4$, and $C^5$, differing slightly in detail from the counters illustrated in Figs. 1 and 2. As in Figs. 1 and 2, the circular circumference of the counter is divided into the required number of arcs, and each of the latter is surrounded by an arch having a less radius than that of the circumference of the counter. These small arches are divided by diverging lines into three triangular spaces or sectors. The numerals are located within the central sectors inclosed by each of the small arches. Instead of employing white and black arches around the numerals to correspond with the surfaces of the ring-sections in the next highest counter, zones or concentric bands c', $c^2$, $c^3$, $c^4$, and $c^5$, respectively, are provided adjacent to the circumference of the counters C', $C^2$, $C^3$, $C^4$, and $C^5$, respectively. The concentric bands or zones are divided into two parts differently colored or capable of producing different optical effects. The portion of the zone adjacent to the higher numerals "5" to "9" of each counter is black to correspond with the black surfaces of the sectors in each of the arches of the next higher counter which are last reached by the pointer in its usual travel. It is obvious that when the pointer registers "0," "1," "2," "3," "4," or "5" it will be above the white portion of the zone, and the pointer of the next higher counter is thereby located within the arch the sector in which adjacent to the pointer is white.

The pointer of counter C' is near the center of the arc "8," and hence its reading is clear; but the pointer of $C^2$ is between the arcs "4" and "5," and hence it is readily located in the arc "5," inasmuch as the pointer of dial $C^3$ is above the white portion of the zone $c^3$, which at once locates the pointer on the counter $C^2$ upon the white sector which is in the arc "5." The pointer of the counter $C^3$ clearly reads "0;" but the reading of the counter $C^4$ can only be determined by inspecting the counter $C^5$, as its pointer is between the arcs "6" and "7." As the pointer of the counter $C^5$ is above the white portion of the zone $c^5$, the pointer of the counter $C^4$ is at once located in the arc "7," as the sector therein adjacent to the pointer is white. The reading of the dial in Fig. 3 is consequently "85072."

From the foregoing description it will be observed that I have invented an improved dial for integrating meters the reading of any counter in which may be readily determined by merely glancing at the pointer of the next lower counter without having to consider the direction of movement of such pointer or the numerals toward which it points. In other words, the positions of the pointers of adjacent counters with respect to areas differently colored or producing different optical effects properly arranged around the counters determine which one of two possible readings is the correct one. My counter also secures the advantage that the pointer never obscures the figures, and it will be found easier to take readings from a dial wherein it is merely necessary to determine what space the pointer is in rather than what point it has passed.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In a counter for registering-dials, the combination with an indicating device, of a circumference relative to which the indicating device moves, said circumference being divided into a predetermined number of spaces, surfaces on either side of the juncture-points between adjoining spaces which produce different optical effects, said surfaces on corresponding sides of the juncture-points between the spaces producing similar optical effects.

2. In a registering-dial, a counter comprising a pointer, a circumference divided into a predetermined number of equal spaces, surfaces on either side of the juncture-points between adjoining spaces which produce different optical effects, said surfaces on corresponding sides of the juncture-points between the spaces producing the same optical effect, an arch described around each of said spaces, and a numeral designating said spaces located within the corresponding arches.

3. In a counter for registering-dials, the combination with an indicating device, of a circumference relative to which the indicating device moves, a ring surrounding said circumference divided into sections, said sections on either side of the juncture-points between adjoining sections having surfaces which produce different optical effects, said surfaces on corresponding sides of the juncture-points between the sections producing the same optical effect.

4. In a dial for integrating meters, a counter comprising a pointer, a circumference divided into a predetermined number of spaces, numerals designating said spaces progressively in the order in which they are reached by the pointer in its rotation, surfaces on either side of each juncture-point between the adjacent spaces which produce different optical effects, the surfaces on corresponding sides of all the juncture-points between said spaces producing the same optical effects, and surfaces adjacent to the numerals designating the first half of the spaces reached by the pointer in its rotation producing the same optical effect as the surfaces on the sides of the juncture-points between said spaces first reached by the pointer.

5. In a dial for integrating meters, a counter comprising a pointer, a circumference divided into a predetermined number of spaces, arches described around each of said spaces, numerals located within said arches designating said spaces progressively in the order in which they are reached by the pointer in its rotation, surfaces on either side of each juncture-point between adjacent spaces which produce different optical effects, said surfaces on corresponding sides of all the juncture-points between said spaces producing the same optical effect and surfaces located around the first half of said arches reached by the pointer producing the same optical effect as the surfaces on the sides of the juncture-points between said spaces first reached by the pointer.

6. In a dial for integrating meters, a counter comprising a pointer, a circumference divided into a predetermined number of spaces, numerals designating said spaces progressively in the order in which they are reached by the pointer in its rotation, surfaces on either side of each juncture-point between the adjacent spaces which produce different optical effects, the surfaces on corresponding sides of all the juncture-points between said spaces producing the same optical effects, surfaces adjacent to the numerals designating the first half of the spaces reached by the pointer in its rotation producing the same optical effect as the surfaces on the sides of the juncture-points between said spaces first reached by the pointer, and surfaces adjacent to the numerals designating the last half of the spaces reached by the pointer producing the same optical effect as the surfaces on the sides of the juncture-points between said spaces last reached by the pointer.

7. In a dial for integrating meters, a plurality of counters each comprising a pointer, a circumference divided into a predetermined number of spaces, numerals designating said spaces progressively in the order in which they are reached by the pointer in its rotation, surfaces on either side of each juncture-point between adjacent spaces producing different optical effects, said surfaces on corresponding sides of all the juncture-points between said spaces producing a similar optical effect, and surfaces on each lower counter adjacent to the numerals designating the first half of the spaces reached by the pointer which produce an optical effect similar to the surfaces of the next higher counter on the sides of the juncture-points between the spaces thereon first reached by its pointer.

8. In a dial for integrating meters, a plurality of counters each comprising an indicating device and a surface relative to which the indicating device moves, said surface being divided into spaces adjacent to which the indicating device successively moves, each of said spaces being divided into two portions, means associated with the portions of the several spaces first reached by the indicating device capable of producing a given optical effect, means associated with the portions of the several spaces last reached by the indicating device capable of producing a different optical effect from said first means, means associated with the half of the spaces of each lower counter last reached by its indicating device capable of producing an optical effect similar to that produced by the means associated with the last portions of the spaces in the next higher counter reached by its indicating device, and means associated with the half of the spaces of each lower counter first reached by its indicating device capable of producing an optical effect similar to the means associated with the first portions of the spaces on the next higher counter reached by its indicating device.

In testimony whereof I sign this specification in the presence of two witnesses.

ARTHUR J. FARMER.

Witnesses:
S. E. THOMAS,
CHAS. TIMM.